June 26, 1962        E. D. WILKIN        3,040,504
POWER LAWN MOWER AND STEERING MEANS THEREFOR
Original Filed March 9, 1953        2 Sheets-Sheet 1
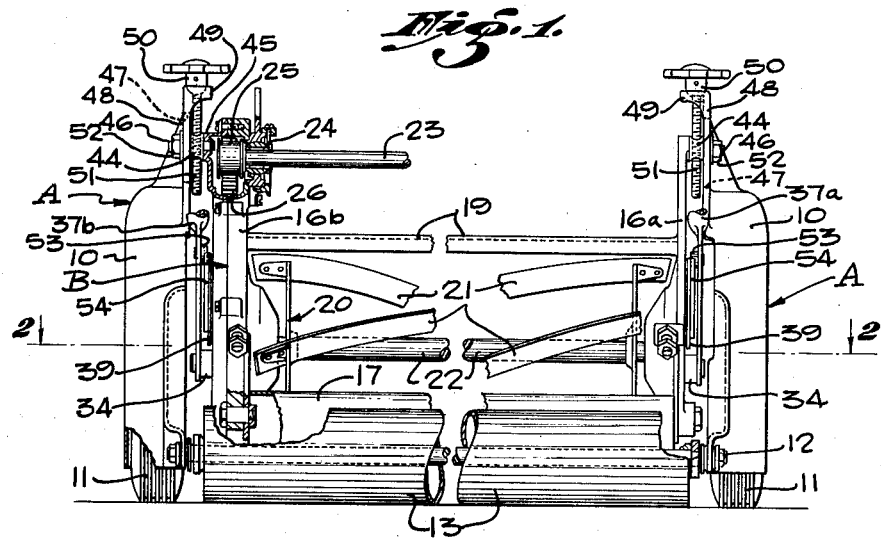
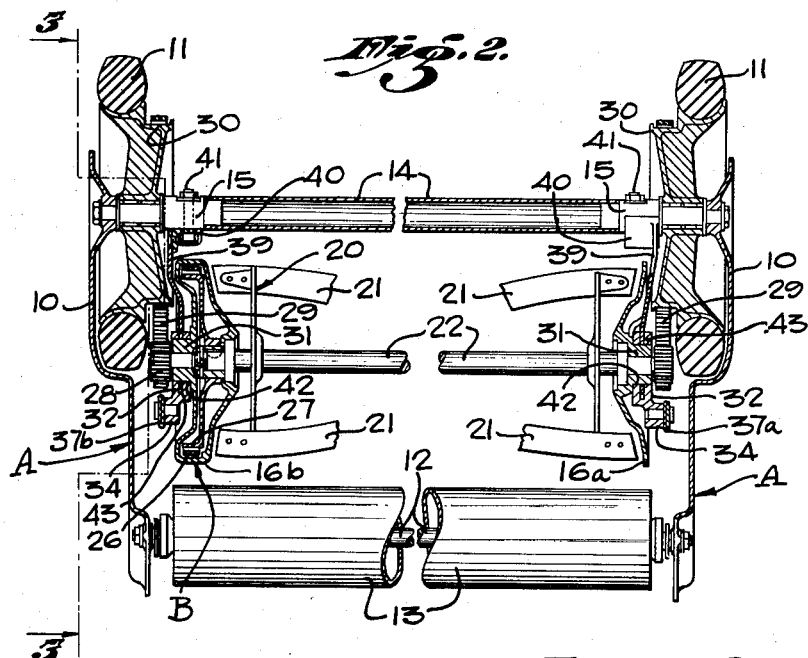
ELLSWORTH D. WILKIN,
INVENTOR.
BY
ATTORNEY June 26, 1962   E. D. WILKIN   3,040,504
POWER LAWN MOWER AND STEERING MEANS THEREFOR
Original Filed March 9, 1953   2 Sheets-Sheet 2
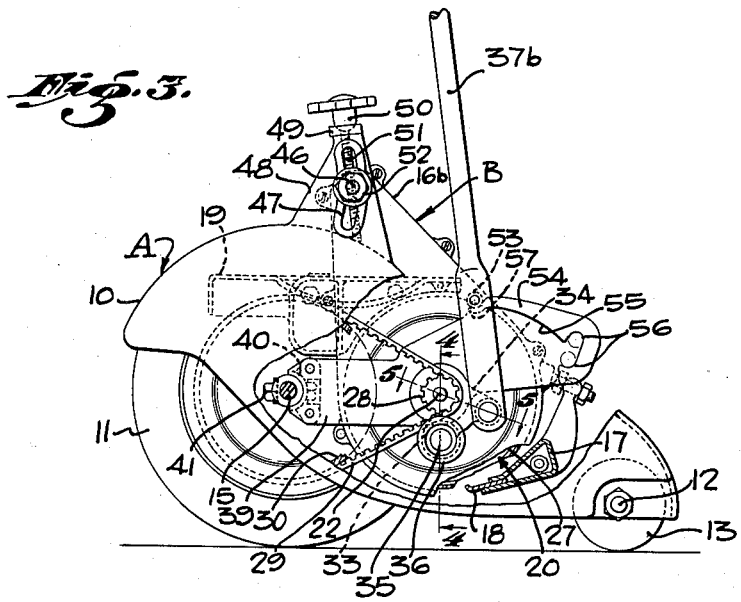
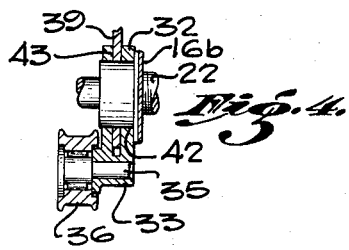
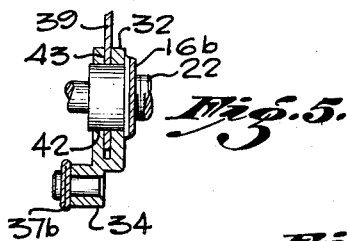
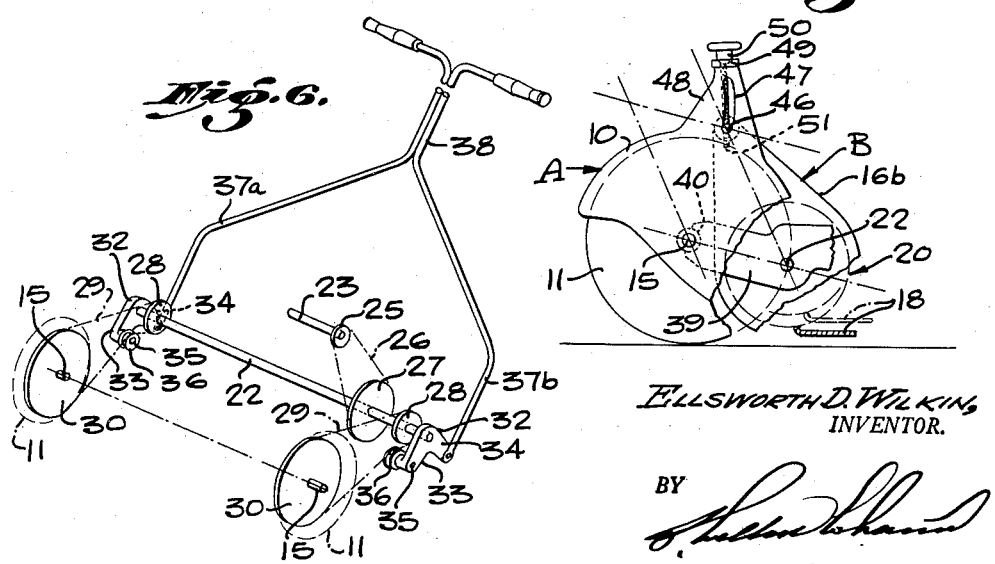
ELLSWORTH D. WILKIN,
INVENTOR.
BY
ATTORNEY United States Patent Office  3,040,504
Patented June 26, 1962

3,040,504
POWER LAWN MOWER AND STEERING MEANS THEREFOR
Ellsworth D. Wilkin, Los Angeles, Calif., assignor to McCulloch Corporation, a corporation of Wisconsin
Continuation of application Ser. No. 341,023, Mar. 9, 1953. This application Apr. 29, 1958, Ser. No. 733,464
10 Claims. (Cl. 56—26)

The present invention relates generally to power driven garden tools, and is more particularly concerned with a lawn mower of the power driven type.

This application is a continuation of my copending application, Serial No. 341,023, filed March 9, 1953, now abandoned.

It is one object of the herein described invention to provide improved yet simple mechanism for controlling the direction of motion of the power driven garden tool. This mechanism includes a guiding handle extending from the frame of the tool and being connected thereto so as to have forward, rearward, and right and left lateral movements relative to the frame, and controls for the driving connections for the traction wheels of the device which are selectively actuated by the forward, rearward, and lateral relative movements of the guiding handle. The result of this arrangement is that the operator, who walks along with the garden tool as it is propelled forwardly, may cause the tool to move forwardly merely by application of forward movement to the handle and may cause the tool to turn to the right or left by moving the handle laterally or horizontally to the right or to the left. As long as the operator moves the handle forwardly the tool will be power-propelled forwardly, but when the forward movement of the handle by the operator is stopped the tool will likewise stop.

A further object is to provide improved means for selectively varying the tension of the driving belts of the mower, which will permit the reel to rotate independently of the traction wheels, and which is so arranged that heat generated by slippage of the belt will be confined to the large pulley sheaves of the traction wheels, where the heat may be readily dissipated.

A further object resides in the provision of power operated guiding mechanism which may be actuated through guiding movements of the mower handle, which is so arranged that driving power may be infinitely regulated by fore and aft manipulation of the handle so as to control the mower speed, and which will enable free-wheeling of the mower rearwardly, when the operator pulls rearwardly on the handle, without creating undesirable conditions such as stalling the motor, scuffing the turf, or unnatural positioning of the mower handle.

Another object is to provide improved means for suspension of the cutting reel and associated bedknife from the wheel structure, which will permit adjustments of the cutting level without changing the angular relationship of the reel and bedknife with respect to the horizontal.

Still another object is to provide an adjusting mechanism for varying the cutting level of the mower without materially affecting the fore and aft center of gravity or balance of the mower, and without disturbing the mower driving elements.

It is also an object to provide unique mechanism for adjusting the cutting level, wherein the cutting components are moved with a translatory motion rather than an angular or rotational motion.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a fragmentary rear elevational view of a mower embodying the features of the invention;

FIG. 2 is a fragmentary horizontally sectioned view, taken substantially on line 2—2 of FIG. 1;

FIG. 3 is an end sectional view for disclosing certain details of construction, taken substantially on line 3—3 of FIG. 2;

FIG. 4 is an enlarged detail section through the belt tensioning means, taken substantially on line 4—4 of FIG. 3;

FIG. 5 is an enlarged sectional view taken substantially on line 5—5 of FIG. 3;

FIG. 6 is a view schematically illustrating the component parts of the mower guiding mechanism; and FIG. 7 is a view schematically illustrating the mechanism for adjusting the cutting level of the mower.

Referring now generally to the drawings, for illustrative purposes the lawn mower of the present invention is disclosed as comprising a traction frame structure A and an operatively associated reel frame structure B. The frame structures each generally comprise a rigid framework, and the frame structures are interconnected for relative adjustable movements as will subsequently be described in detail.

The traction frame structure A comprises a pair of end housings 10 for main traction wheels 11, these end housings being interconnected at their rear by a spacer rod 12 upon which there is mounted a rotatable roller 13 which cooperates with the traction wheels to form a wheeled support for the mower. Forwardly of the roller, the end housings 10 are interconnected through a tubular spacing bar 14 which carries axle extensions 15 at its ends upon which the traction wheels are respectively rotatably mounted.

The reel frame structure B comprises end frames 16a and 16b which are assembled and retained in spaced relation by an adjustable cutter bar 17 which carries an associated bedknife 18, as clearly shown in FIG. 3. The end frames are further connected with an engine deck 19 which provides a mounting platform for a suitable engine or other power means (not shown) for driving the mower.

A reel assembly, as generally indicated by the numeral 20, incorporates the usual cutting blades 21 for engagement upon rotation with the bedknife 18 in a conventional manner. The reel is carried upon a reel shaft 22 supported for rotation in suitable bearings in the end frame 16a and 16b.

The end frame 16b is constructed in the form of a hollow housing for the reel driving instrumentalities. As shown in FIG. 1, an engine drive shaft 23 is arranged with one end projecting into the housing, this end being rotatably supported in a suitable bearing 24 and having affixed thereto a drive pulley 25 which has a driving connection through a belt 26 with a reel pulley 27, as shown in FIG. 2, carried by the reel shaft 22, the pulley 27 being also positioned within the housing defined by the frame 16b.

Means are provided for the selective driving of the traction wheels 11 from the rotating reel shaft 22, so that both wheels 11 may be rotated at the same speed so as to propel the device forwardly over the ground, or so that the wheels 11 may be rotated at different speeds, and thereby steer the device. As shown herein, the reel shaft 22 is fitted at its respective ends with a toothed drive pulley 28 over which a toothed driving belt 29 is trained. The belt 29 provides a driving connection between each drive pulley 28 and a pulley sheave 30 carried by the adjacent traction wheel. The pulley sheave 30 is provided with a smooth or untoothed groove so as to permit slippage of the driving belt 29 to the pulley sheave 30. In this way, heat generated by belt slippage during speed control and guiding will be confined to the pulley sheave 30 which has a relatively larger surface for the dissipation of heat than the drive pulley 28.

As best shown in FIGS. 2 and 3, each end frame 16a and 16b is provided with an annular projection 31 upon which there is rotatably mounted a bell crank 32 having angularly extending legs 33 and 34. The leg 33, in each case, carries a pivot pin 35 at its outer end, as shown in FIG. 4, upon which an idler pulley 36 is rotatably supported and positioned for movement towards and away from the tensioned side of the belt 29, and by means of which the belt tension and the driving effect with respect to the associated drive wheel may be varied.

The legs 34 of the bell cranks at each end of the mower are respectively pivotally connected by pins 34a to a pair of end leg portions 37a and 37b of a mower manipulating handle 38 which is connected by the bell crank 32 to the frame structure A for translational movement relative to the frame structure in contrast to or distinct from rotary movement as would occur if the handle were connected to the frame structure by a pivot pin fixed thereon.

The driving and steering mechanism, described above, has been schematically illustrated in FIG. 6. The power guiding of the mower will be readily accomplished by the conventional lateral movements of the handle 38 and the forward movement is controlled by exerting normal pushing and pulling forces on the handle.

For example, if a forward pushing force is applied to the handle 38 the force will be exerted along a line lying in the handle and passing through the center of the pins 34a which are movable across the face of the frame structure A, causing the bell cranks to swing in clockwise direction so that the idler pulleys 36 will engage the associated driving belts on their tension sides. Therefore, by merely pushing forwardly against the handle 38, without the necessity of swinging it upwardly or downwardly, the operator effects translation of the handle relative to the frame structure A, which translation of the handle actuates the power control mechanism, shown in FIG. 6. A small amount of pressure will suffice to effect a frictional driving engagement between the drive pulleys 28 and the pulley sheaves 30 so as to transmit a certain amount of torque to the traction wheels. When it is desired to transmit more torque to the traction wheels, all that is necessary is that more force be exerted on the handle to force the idler pulleys into the belts.

An outstanding feature of the present invention is the ability of the mower to be guided by exerting leftward or rightward force on the mower handle. A force exerted to the right of the handle will cause forward translational movement of the right handle leg 37a to move the right bell crank in a direction to effect a tightening of the drive belt of the right traction wheel and a corresponding rearward translational movement of the left leg 37b which will rotate the left bell crank in a direction to effect slackening of the drive belt of the left traction wheel. Thus the mower will turn to the left, since more speed will be delivered to the right traction wheel than to the left traction wheel. Conversely, if the mower handle is moved to the left, the reverse action will take place and the mower will turn towards the right. Accurate maneuvering of the mower is thus facilitated, and the bell crank tensioning mechanisms have the effect of operating after the manner of so-called servomechanisms in that the exertion of a small force on the handle releases and controls larger power forces from the driving engine or other power means for maneuvering the direction of movement and traction forces applied to the mower.

The present invention also contemplates a unique suspension of the reel frame structure B from the traction frame structure A, which will enable relative raising and lowering movements of the cutting instrumentalities to vary the cutting level of the mower, without materially affecting the center of gravity or balance of the mower, and without disturbing the mower driving mechanism previously described.

In accomplishing the foregoing, a supporting arm 39 is provided at each end of the reel shaft 22, this arm being in the form of a plate which is fixedly secured at one end to a saddle fitting 40 which is secured to the axle extension 15 near its inner end connection with the tubular spacing bar 14 by means of a suitable securing member such as a bolt 41. Intermediate its ends, the arm 39 is provided with an aperture 42 which receives the adjacent annular projection 31 therethrough so as to form a pivotal support in the arm 39 for the end frames 16a and 16b. It will be noted that the hub portion of the bell crank 32 is in each case slotted as indicated at 43 to receive the adjacent edge margin of the plate between its ends. With this arrangement, the tubular spacing bar forms a torsion bar connection between the arms 39.

As shown in FIGS. 1 and 3, each end frame 16a and 16b is adjustably connected at its upper end to the adjacent upper portion of the adjacent end housing 10. More specifically, a nut 44 is in each case provided with a lateral projection 45 by means of which the nut is swivelly mounted on the end frame. On the opposite side of the nut, there is a threaded shank 46 adapted to extend through an arcuate slot 47 in a projecting lug 48 of the end housing 10. The upper end of the lug 48 is provided with a ledge 49 which forms a seat for the head portion 50 of a manually adjusting screw 51 which has threaded engagement with the nut 44. By manually turning the screws 51 at each end of the mower, the reel frame structure B may be raised and lowered with respect to the traction frame structure A. The frame structures may be secured in adjusted position by means of clamping nuts 52 respectively associated with the threaded shanks 46.

The arcuate slot 47 is constructed with a radius of curvature which corresponds with the axial spacing between the center line of the axial extensions 15 and the center line of the reel shaft 22, so that the arms 39 cooperate with the arcuate slots 47 and associated shanks 46 to provide in effect a parallel motion connection between the traction frame structure A and the reel frame structure B, as indicated by the dash-dot lines in FIG. 7 of the drawings which show the bedknife 18 in raised position, yet parallel to the ground. By manipulating the screws 51, the reel with its cutting blades and the associated bedknife may be raised and lowered with a translatory movement to change the cutting level of the mower as diagrammatically illustrated in FIG. 7, without materially affecting the center of gravity or a balance of the mower, and without disturbing the mower driving elements.

As further shown in FIGS. 1 and 3, the leg portions 37a and 37b of the mower handle are respectively provided with projections 53 for a purpose which will now be described. The free-end of the plate which defines each of the arms 39 is in each case provided with a thickened end portion 54 which is fabricated to provide an abutment arcuate shoulder 55 under which the projection 53 of the end leg portions may be positioned to permit the application of a backward pulling force on the handle, when it is desired to move the mower rearwardly. In this position, the idler pulleys 36 will be in released position with respect to the driving belts and will thus permit the driving belt to slip during such rearward movement of the mower.

At the respective ends of the shoulder 55, dwell positions 56 and 57 are provided which enable the projection 53 to be so positioned as to permit the handle to be placed in a storage position. When the projections 53 are reposing in the dwell positions 56, the handle will extend in a lowered position rearwardly of the mower, whereas when the projections 53 repose in the dwell positions 57, the handle will be in a raised storage position.

Various modifications may suggest themselves to those skilled in the art without departing from the spirit of my invention, and, hence, I do not wish to be restricted to the specific form shown or uses mentioned, except to the extent indicated in the appended claims.

I claim:

1. In a power mower: a first frame structure; driving wheels rotatably supported at the ends of said frame structure; a second frame structure adapted to support a rotatable reel and an associated bedknife; a link member having its ends respectively pivotally connected with said frame structures; an arcuate slot and pin connection between said frame structures cooperatively acting with said link member to provide a parallel motion connection enabling raising and lowering translatory movement of said second frame structure in a raising and lowering direction; and power transmission means for driving said reel and said wheels.

2. In a wheeled device: a first frame structure; a driving wheel at each end of said frame structure; a second frame structure adapted to support a tool; a link member having its ends respectively pivotally connected to said frame structure; and an arcuate slot and pin connection between said frame structures cooperatively acting with said link member to provide a parallel motion connection enabling raising and lowering movement of said second frame structure relative to said first frame structure.

3. In a wheeled device: a first frame structure; a driving wheel at each end of said frame structure; a second frame structure adapted to support a tool; a link member having its ends respectively pivotally connected to said frame structures; an arcuate slot and pin connection between said frame structures spaced from said link member and cooperatively acting with said link member to provide a parallel motion connection enabling raising and lowering of said second frame structure relative to said first frame structure; and power transmission means for driving said wheels.

4. In a powered device: a frame structure; a driving wheel at each end of said structure having a pulley sheave; driving means for each wheel including a driving pulley and belt connecting said pulley and sheave; a tension regulating member associated with each belt; a swingable handle having a pair of end leg portions respectively connected with said tension regulating members so as to be responsive to guiding movements of said handle; a projection extending from each end leg portion; an arcuate flange at each end of the frame structures arranged to overlie the adjacent projection of said handle and form an abutment adapted to be engaged by the projection when a pulling force is applied to said handle, whereby the pulling force is transmitted to said frame structure; and dwell points at the ends of said flange corresponding to raised and lowered positions of said handle.

5. In a powered device: a frame structure; a driving wheel at each end of said structure having a pulley sheave; driving means for each wheel including a driving pulley and belt connecting said pulley and sheave; a tension regulating member associated with each belt; a swingable handle having a pair of end leg portions respectively connected with said tension regulating members so as to be responsive to guiding movements of said handle; a projection extending from each end leg portion; and an arcuate flange at each end of the frame structure arranged to overlie the adjacent projection of said handle and form an abutment adapted to be engaged by the projection when a pulling force is applied to said handle, whereby the pulley force is transmitted to said frame structure.

6. In a power mower: a first frame structure including an axle; driving wheels rotatably supported at the ends of said axle, and respectively having a pulley sheave; a second frame structure; a reel and associated bedknife carried by said second frame structure, said reel being rotatably supported and having a pulley at each end; projecting arms respectively secured to said axle adjacent its ends, said axle forming a torsion bar; means connecting said second frame structure to said arms for pivotal movements about the axis of rotation of said pulleys; and driving belts respectively connecting said pulleys and sheaves.

7. In a power mower: a first frame structure including an axle; driving wheels rotatably supported at the ends of said axle, and respectively having a pulley sheave; a second frame structure; a reel and associated bedknife carried by said second frame structure, said reel being rotatably supported and having a pulley at each end; swingable arms carried by said axle having their outer ends connected to said second frame structure for pivotal movement on the axes of rotation of said pulleys; a slot and pin connection between said frame structures cooperative with said swingable arms to effect relative translatory raising and lowering movements of said frame structures; driving belts respectively connecting said pulleys and sheaves; a movably mounted idler pulley associated with each belt; and a guide handle connected with said pulleys, said handle being movable so as to selectively vary the idler pulleys and change the driving effect of said belts.

8. In a power mower: a first frame structure including an axle; driving wheels rotatably supported at the ends of said axle, and respectively having a pulley sheave; a second frame structure; a reel and associated bedknife carried by said second frame structure, said reel being rotatably supported and having a pulley at each end; swingable arms carried by said axle having their outer ends connected to said second frame structure for pivotal movement on the axes of rotation of said pulleys; a slot and pin connection between said frame structures cooperative with said swingable arms to effect relative translatory raising and lowering movements of said frame structures; driving belts respectively connecting said pulleys and sheaves; and guiding means including selectively operable members for varying the tension of said belts.

9. In a power mower: a first frame structure including an axle; driving wheels rotatably supported at the ends of said axle, and respectively having a pulley sheave; a second frame structure; a reel and associated bedknife carried by said second frame structure, said reel being rotatably supported and having a pulley at each end; swingable arms carried by said axle having their outer ends connected to said second frame structure for pivotal movement on the axes of rotation of said pulleys; a slot and pin connection between said frame structures cooperative with said swingable arms to effect relative translatory raising and lowering movements of said frame structures; and driving belts respectively connecting said pulleys and sheaves.

10. In a powered device: a frame structure; a driving wheel at each end of said structure having an associated pulley sheave; driving means for each wheel including a driving pulley and a belt connecting it with the associated driving wheel pulley sheave; a movably supported idler pulley associated with said belts; a guiding handle extending from said frame structure; connecting means for connecting said handle to said frame structure, said connecting means being movable in forward-rearward direction relative to said supporting structure so that said handle will have translational movement relative to said frame structure; and means connecting said handle to said idler pulleys so that forward movement of said handle relative to said frame structure will move said idler pulleys toward said belts.

References Cited in the file of this patent
UNITED STATES PATENTS 2,519,270    Millar    Aug. 15, 1950
2,818,699    Clemson    Jan. 7, 1958